US 8,508,903 B2

(12) United States Patent
Chien

(10) Patent No.: US 8,508,903 B2
(45) Date of Patent: Aug. 13, 2013

(54) NETWORK COMMUNICATION DEVICE

(75) Inventor: Tung-Liang Chien, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 173 days.

(21) Appl. No.: 13/185,518

(22) Filed: Jul. 19, 2011

(65) Prior Publication Data

US 2012/0300353 A1 Nov. 29, 2012

(30) Foreign Application Priority Data

May 27, 2011 (TW) ............................... 10118553 A

(51) Int. Cl.
*H02H 5/04* (2006.01)
*G01R 31/00* (2006.01)
*H04L 12/26* (2006.01)

(52) U.S. Cl.
USPC ............................... 361/103; 702/58; 370/245

(58) Field of Classification Search
USPC ........................... 361/103; 702/58; 370/245
See application file for complete search history.

(56) References Cited

U.S. PATENT DOCUMENTS

| 7,734,432 | B2 | 6/2010 | Chuang | |
|---|---|---|---|---|
| 2007/0064855 | A1* | 3/2007 | Yeh | 375/377 |
| 2010/0182726 | A1* | 7/2010 | Xiong et al. | 361/93.9 |
| 2010/0272433 | A1* | 10/2010 | Shaffer et al. | 398/17 |
| 2011/0242715 | A1* | 10/2011 | Voisine et al. | 361/65 |

* cited by examiner

*Primary Examiner* — Scott Bauer
(74) *Attorney, Agent, or Firm* — Altis Law Group, Inc.

(57) ABSTRACT

A network communication device for generating dying gasp signals includes a voltage detection circuit, a charging and discharging circuit, a power supply circuit, a central processing unit (CPU), a load circuit, an over-heating detection circuit, and an over-heating protection circuit. The CPU includes a dying gasp detection pin connected to the voltage detection circuit to retrieve a detected voltage of an external power supply, and determines whether the external power supply is off according to the detected voltage, and generates dying gasp signals upon the condition that the external power supply is off. The over-heating protection circuit changes voltage of the dying gasp detection pin of the CPU to make the CPU to generate the dying gasp signals and to turn off the load circuit and the power supply circuit upon the condition that the over-heating detection circuit determines that the network communication device overheats.

18 Claims, 5 Drawing Sheets

NETWORK COMMUNICATION DEVICE

BACKGROUND

1. Technical Field

The disclosure relates to network communications, and particularly to a network communication device capable of generating dying gasp signals.

2. Description of Related Art

Digital subscriber line (XDSL) devices are capable of generating dying gasp signals. Thus, by analyzing the dying gasp signals, people of a central office (CO) can determine whether the XDSL devices may have various problems, such as power off or line problems. Due to over-heating of the XDSL devices, which may result in melting and deformation of the enclosure of the XDSL devices, thermal protection function is added into the XDSL devices. However, the thermal protection function has no relation to generating dying gasp signals, which may result in misjudgment.

DETAILED DESCRIPTION

Figure 1:
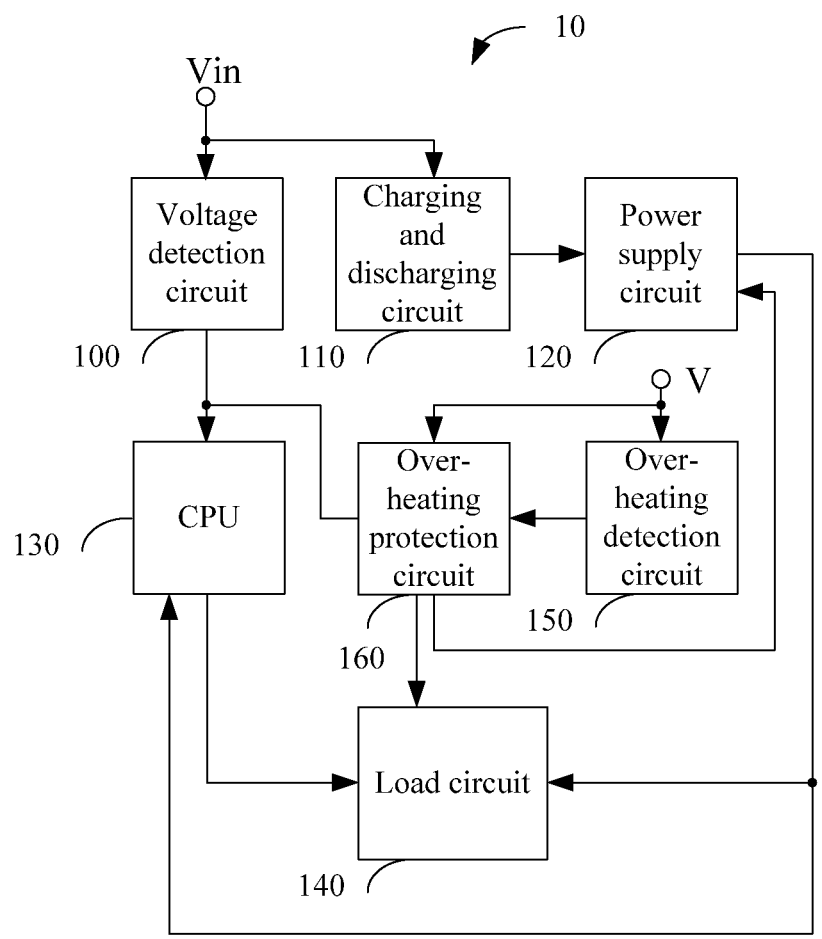
FIG. 1 is a schematic diagram of one embodiment of a network communication device as disclosed.

FIG. 1 is a schematic diagram of one embodiment of a network communication device 10 as disclosed. In one embodiment, the network communication device 10 may be a digital subscriber line (DSL) device, which generates dying gasp signals to send to a central office device. The network communication device 10 includes a voltage detection circuit 100, a charging and discharging circuit 110, a power supply circuit 120, a central processing unit (CPU) 130, a load circuit 140, an over-heating detection circuit 150, and an over-heating protection circuit 160. The voltage detection circuit 100 is connected to an external power supply Vin, which provides power to the network communication device 10, and detects voltage of the external power supply Vin. The charging and discharging circuit 110 is connected to the external power supply Vin, is charged when the external power supply Vin is on, and discharges when the external power supply Vin is off.

The power supply circuit 120 is connected to the charging and discharging circuit 110, and converts input voltage of the power supply circuit 120 into a plurality of output voltages to provide power to the network communication device 10, especially to the CPU 130 and the load circuit 140, to maintain operations of the network communication device 10. In one embodiment, when the external power supply Vin is on, the input voltage of the power supply circuit 120 is provided by the external power supply Vin, and the power supply circuit 120 converts the input power provided by the external power supply Vin into the plurality of output voltages. When the external power supply Vin is off, the charging and discharging circuit 110 discharges to the power supply circuit 120 to provide the input voltage of the power supply circuit 120. The CPU 130 and the load circuit 140 may need different input voltages, so the plurality of output voltages from the power supply circuit 120 may be different.

The CPU 130 is connected to the voltage detection circuit 100 and the power supply circuit 120, and includes a dying gasp detection pin connected to the voltage detection circuit 100 to retrieve the detected voltage. The CPU 130 controls the operations of the network communication device 10, such as, generating control signals to control whether the load circuit 140 works. The CPU 130 further determines whether the external power supply Vin is off according to the detected voltage, and generates dying gasp signals upon the condition that the external power supply Vin is off, to send to the central office device. Thus, the central office device knows that the network communication device 10 is powered off, which avoids misjudgment of line quality. In one embodiment, the CPU 130 determines whether the external power supply Vin is off according to whether the detected voltage is higher than a predetermined value. In one embodiment, the predetermined value may be set according to actual needs, such as, being 1.67V. The CPU 130 determines the external power supply Vin is off upon the condition that the detected voltage, that is, the voltage of the dying gasp detection pin, is lower than the predetermined value. The CPU 130 determines the external power supply Vin is on upon the condition that the detected voltage is higher than the predetermined value. The load circuit 140 is connected to the CPU 130 and the power supply circuit 120, and works under control of the CPU 130.

The over-heating detection circuit 150 detects whether the network communication device 10 overheats. The over-heating detection circuit 150 is powered by a first voltage V to maintain uninterrupted power. In one embodiment, the first voltage V is provided by an independent power supply. In alternative embodiments, the first voltage V is provided by the power supply circuit 120. The over-heating detection circuit 150 may be implemented by thermal elements and comparators. The thermal elements, such as thermal resistors, may generate different voltage signals under different temperatures. The comparators compare the different voltage signals with a reference value to determine whether the network communication device 10 overheats, and output different notify signals to the over-heating protection circuit 160.

The over-heating protection circuit 160 is connected to the over-heating detection circuit 150, the dying gasp detection pin of the CPU 130, the power supply circuit 120, and the load circuit 140, and changes voltage of the dying gasp detection pin of the CPU 130 to make the CPU 130 to generate the dying gasp signals when the network communication device 10 overheats. The over-heating protection circuit 160 also turns off the load circuit 140 and the power supply circuit 120. The over-heating protection circuit 160 is powered by the first voltage V to maintain uninterrupted power. In one embodiment, the first voltage V is provided by an independent power supply. In alternative embodiments, the first voltage V is provided by the power supply circuit 120.

In one embodiment, when the network communication device 10 works normally, the charging and discharging circuit 110 is charged, the voltage detection circuit 100 obtains the detected voltage with a high logic level, such as, 1.25V. Thus, the CPU 130 determines the external power supply Vin provides power normally according to the detected voltage with the high logic level, and no dying gasp signal is generated. If the network communication device 10 is over-heat, the over-heating detection circuit 150 detects that the network communication device 10 is over-heat, and notifies the over-heating protection circuit 160. The over-heating protection circuit 160 changes the voltage of the dying gasp detection pin of the CPU 130, that is, pulling down the voltage of the dying gasp detection pin. Thus, the CPU 130 determines the external power supply Vin is off, and generates the dying gasp signals to notify the central office device. At the same time, the over-heating protection circuit 160 slowly turns off the power supply circuit 120 to make the power supply circuit 120 to provide necessary power to the CPU 130 to generate the dying gasp signals. The over-heating protection circuit 160 immediately turns off the load circuit 140 to save power. Thus, increasing temperature resulted by the power supply circuit 120 and the load circuit 140 is avoided.

When the external power supply Vin is off, the voltage detection circuit 100 detects the detected voltage with a low logic level, such as, nearly zero, and the CPU 130 determines the external power supply Vin is off according to the detected voltage with the low logic level. The charging and discharging circuit 110 discharges to the power supply circuit 120 to provide the input power. Thus, the power supply circuit 120 provides necessary output voltage to the CPU 130 to generate the dying gasp signals.

The network communication device 10 can generate the dying gasp signals under both power off condition and over-heat condition, which avoids misjudgment of the central office device.

Figure 2:
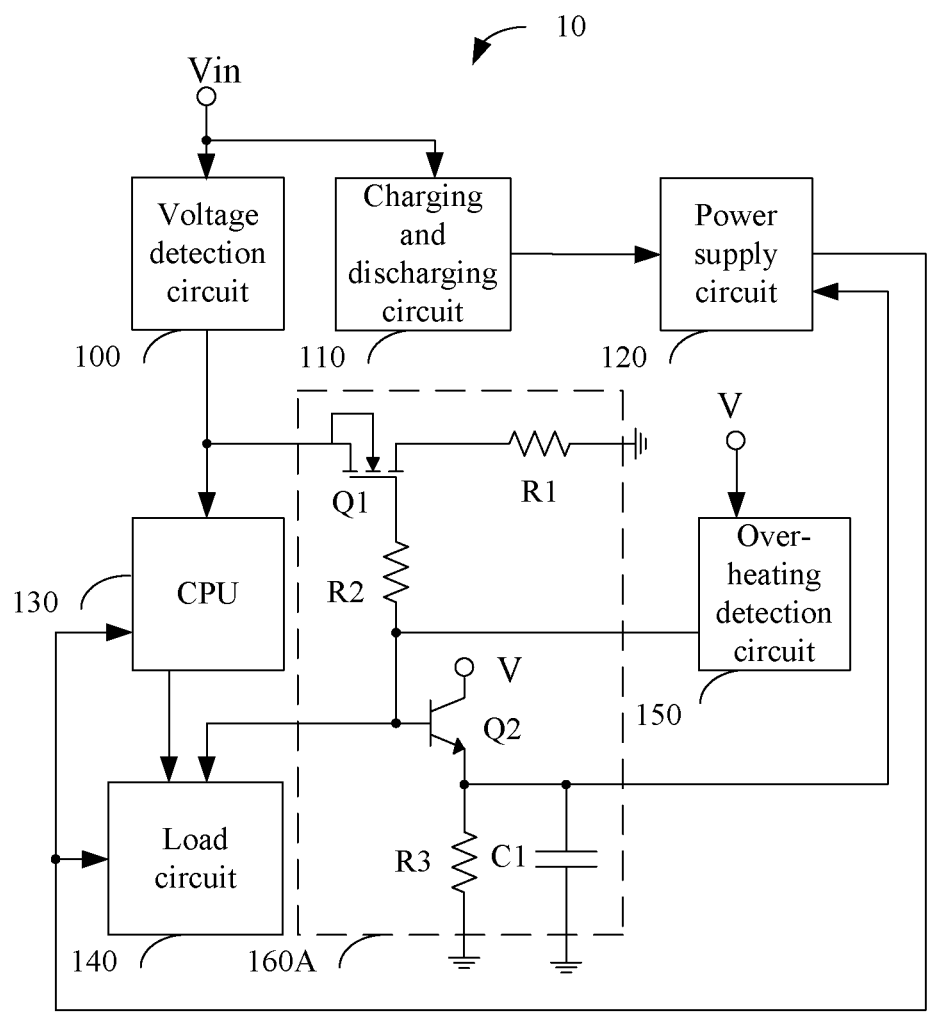
FIG. 2 is a circuit diagram of a first embodiment of an over-heating protection circuit of a network communication device.

FIG. 2 is a circuit diagram of a first embodiment of an over-heating protection circuit 160A. The over-heating protection circuit 160A includes a first switch element Q1, a first resistor R1, a second resistor R2, a second switch element Q2, a third resistor R3, and a first capacitor C1. The first switch element Q1 and the second switch element Q2 both include a control pole, a first pole, and a second pole. The first pole of the first switch element Q1 is connected to the dying gasp detection pin of the CPU 130, the second pole of the first switch element Q1 is grounded via the first resistor R1, and the control pole of the first switch element Q1 is connected to the over-heating detection circuit 150 via the second resistor R2. The control pole of the second switch element Q2 is connected to the control pole of the first switch element Q1 via the second resistor R2 and connected to the load circuit 140, the first pole of the second switch element Q2 receives the first voltage V, the second pole of the second switch element Q2 is grounded via the third resistor R3 and connected to the power supply circuit 120. The first capacitor C1 and the third resistor R3 are parallel.

In one embodiment, the first switch element Q1 is a p type metal oxide semiconductor field effect transistor (PMOS-FET), the control pole of the first switch element Q1 is a gate of the PMOSFET, the first pole of the first switch element Q1 is a source of the PMOSFET, and the second pole of the first switch element Q1 is a drain of the PMOSFET. The second switch element Q2 is a NPN type transistor, the control pole of the second switch element Q2 is a base of the NPN type transistor, the first pole of the second switch element Q2 is a collector of the NPN type transistor, and the second pole of the second switch element Q2 is an emitter of the NPN type transistor. The first resistor R1 may be 20 Kohm, the third resistor R3 may be 47 Kohm.

When the network communication device 10 works normally, the over-heating detection circuit 150 generates high voltage level signal, which is indicated by logic 1, to notify the over-heating protection circuit 160A. Thus, the first switch element Q1 is off. Because the first switch element Q1 have high impedance feature when the first switch element Q1 is off, the voltage of the dying gasp detection pin of the CPU 130 does not be changed, and the CPU 130 generates no dying gasp signals. The second switch element Q2 is on, and voltage of the second pole of the second switch element Q2 is high. Thus, the first capacitor C1 is charged. The over-heating protection circuit 160A send enable signals with high logic level to the power supply circuit 120 and the load circuit 140 to maintain normal work.

When the network communication device 10 overheats, the over-heating detection circuit 150 generates low voltage level signals to notify the over-heating protection circuit 160A. The first switch element Q2 is on, and the first resistor R1 divides the voltage of the dying gasp detection pin of the CPU 130 to pull down the voltage of the dying gasp detection pin of the CPU 130. Thus, the CPU 130 generates the dying gasp signals. At the same time, the over-heating protection circuit 160A generates and sends enable signals with low logic level to the load circuit 140 to decrease power loss of the network communication device 10, which avoids continuous over-heat condition. The second switch element Q2 is off, and the first capacitor C1 discharges via the third resistor R3. That is, the over-protection circuit 160A send enable signals with slowing down voltage level to the power supply circuit 120. Thus, the power supply circuit 120 first provides necessary power to the CPU 130 to generate the dying gasp signals, and then is cut off.

The network communication device 10 pulls down the voltage of the dying gasp detection pin of the CPU 130 when the network communication device 10 overheats, to make the CPU 130 to generate the dying gasp signals. The network communication device 10 immediately turns off the load circuit 140 to reduce power loss, thus, the power supply circuit 120 only provides power to the CPU to reduce time to generate the dying gasp signals. In addition, because of the first switch element Q1, the over-heating protection circuit 160A and the voltage detection circuit 100 are isolated, which avoids interference between the power off detection function and the over-heating protection function.

Figure 3:
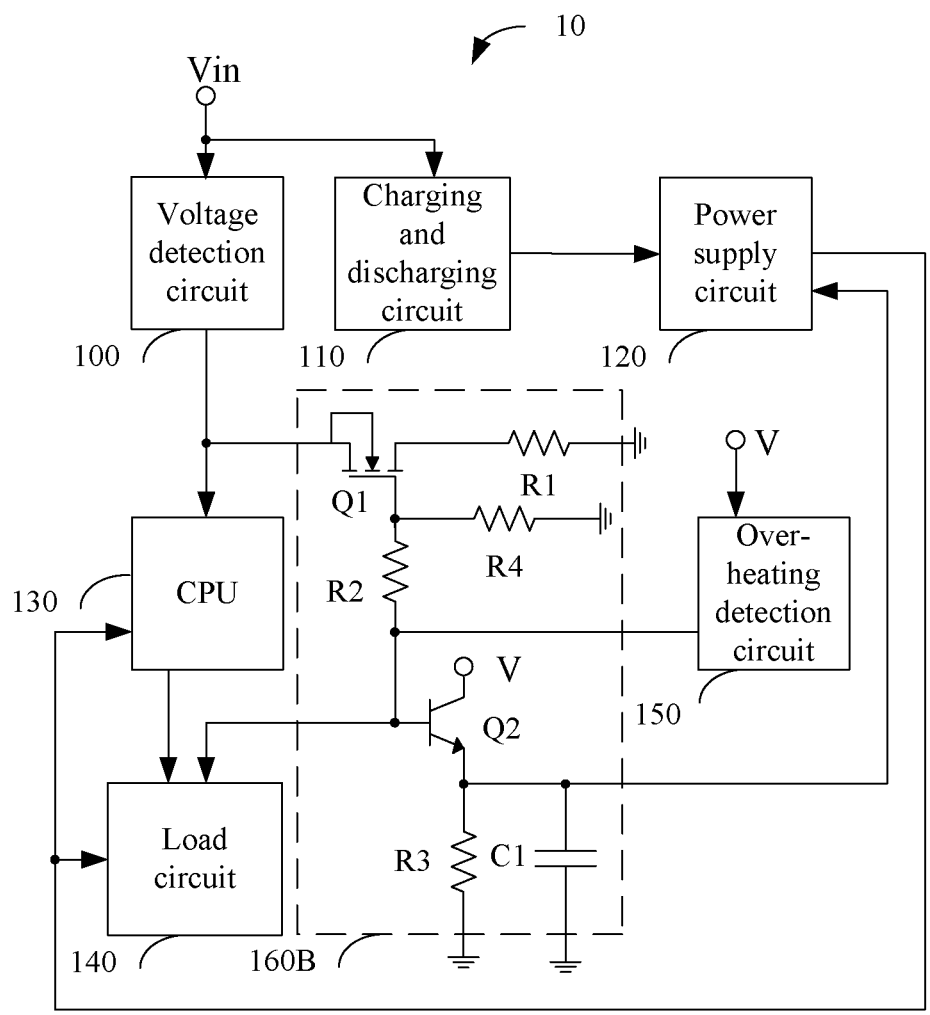
FIG. 3 is a circuit diagram of a second embodiment of an over-heating protection circuit of a network communication device.

FIG. 3 is a circuit diagram of a second embodiment of an over-heating protection circuit 160B. The over-heating protection circuit 160B is similar to the over-heating protection circuit 160A of FIG. 2 except that the over-heating protection circuit 160B further includes a fourth resistor R4. The fourth resistor R4 is connected between the control pole of the first switch element Q1 and the ground. The fourth resistor R4 and the second resistor R2 form a voltage dividing circuit to regulate the voltage of the control pole of the first switch element Q1.

Figure 4:
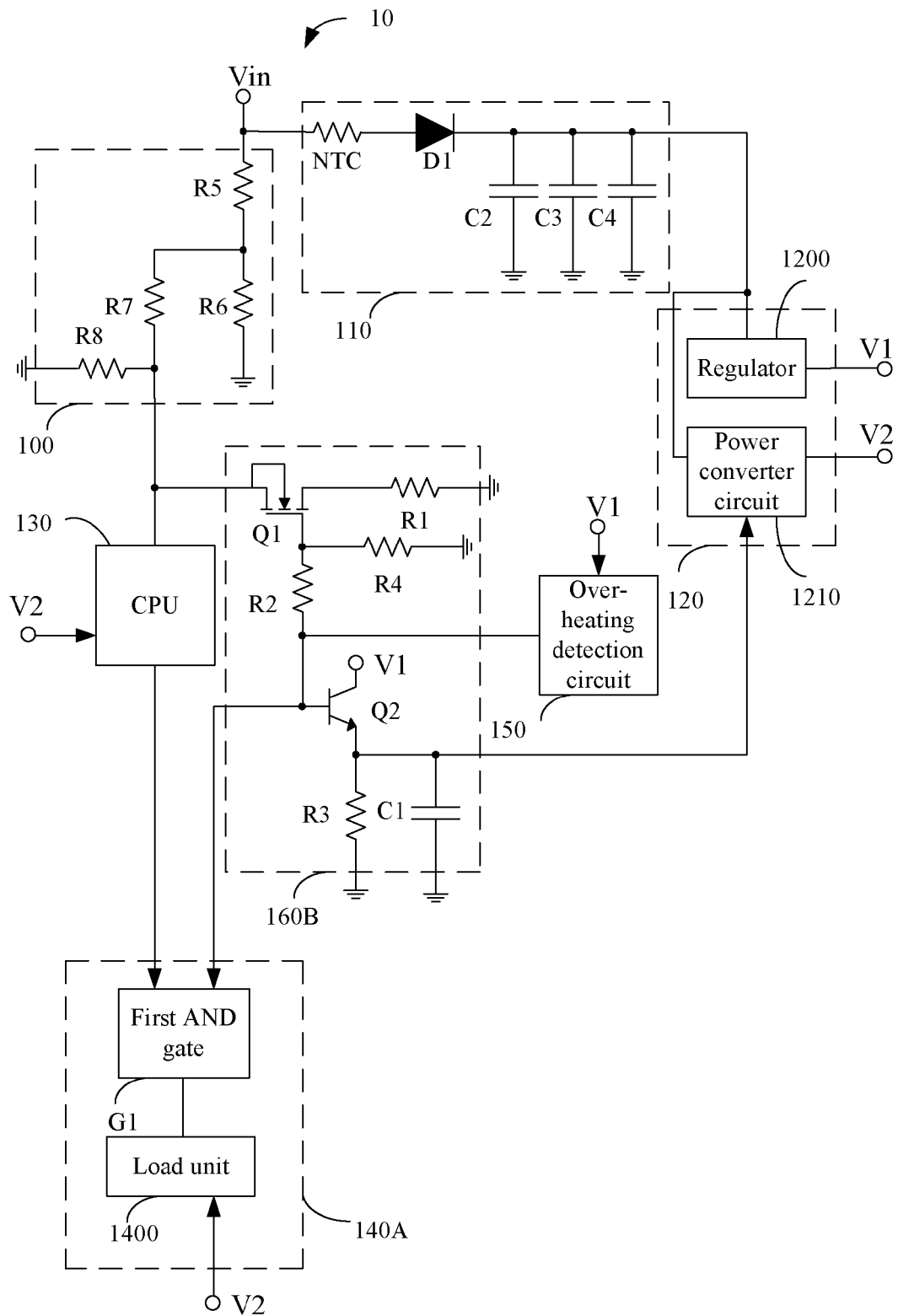
FIG. 4 is a circuit diagram of a first embodiment of a network communication device as disclosed.

FIG. 4 is a circuit diagram of one embodiment of the network communication device 10 as disclosed, especially a circuit diagram of the voltage detection circuit 100, the charging and discharging circuit 110, the power supply circuit 120, and a load circuit 140A. The voltage detection circuit 100 includes fifth to eighth resistors R5 to R8. The fifth resistor R5 and the sixth resistor R6 are connected between the external power supply Vin and the ground in series. The seventh resistor R7 and the eighth resistor R8 are connected between a junction of the fifth resistor R5 and the sixth resistor R6 and the ground in series, a junction of the seventh resistor R7 and the eighth resistor R8 are connected to the dying gasp detection pin. In one embodiment, the voltage of the external power supply Vin may be 12V, the fifth resistor R5 may be 47 Kohm, the sixth resistor R6 may be 39 Kohm, the seventh resistor R7 may be 24 Kohm, and the eighth resistor R8 may be 20 Kohm. Thus, when the external power supply Vin provides power normally, the voltage of the dying gasp detection pin of the CPU 130 is 1.67V, and voltage of the junction of the fifth resistor R5 and the sixth resistor R6 is 3.67V. In one embodiment, when the voltage of the dying gasp detection pin of the CPU 130 is lower than 1.25V (with +/−2.5% tolerance), the CPU 130 generates the dying gasp signals.

The charging and discharging circuit 110 includes a thermal resistor NTC, a first diode D1, and at least one capacitor. Capacitance and numbers of the at least one capacitor are set according to power need of the network communication device 10, in one embodiment, the at least one capacitor includes a second capacitor C2, a third capacitor C3, and a fourth capacitor C4 connected in parallel. In one embodiment, the second capacitor C2, the third capacitor C3, and the fourth capacitor C4 have low capacitance, which avoids usage of large capacitance capacitor and decreases thickness of the network communication device 10. The thermal resistor NTC is connected between the external power supply Vin and an anode of the diode D1, and suppresses inrush current generated when the external power supply Vin is turned on. A cathode of the diode D1 is connected to the power supply circuit 120, and is grounded via the second capacitor C2, the third capacitor C3, and the fourth capacitor C4 in parallel. In one embodiment, the thermal resistor NTC is a negative temperature coefficient thermal resistor.

When the external power supply Vin provides power normally, the diode D1 is on, and the second capacitor C2, the third capacitor C3, and the fourth capacitor C4 is charged. The external power supply Vin provides the input voltage to the power supply circuit 120 via the thermal resistor NTC and the diode D1. When the external power supply Vin is off, the second capacitor C2, the third capacitor C3, and the fourth capacitor C4 discharge to the power supply circuit 120. At this time, the diode D1 is off to block current flowing back to the external power supply Vin, which avoids power loss.

The power supply circuit 120 includes a regulator 1200 and a plurality of power converter circuits 1210 (only one shown). The regulator 1200 includes an input and an output, the input of the regulator 1200 is connected to the cathode of the diode D1 of the charging and discharging circuit 110, and the output of the regulator 1200 outputs a first output voltage V1 to provide power to the over-heating detection circuit 150 and the over-heating protection circuits 160, 160A, 160B. That is, the first voltage V is the first output voltage V1. In one embodiment, the first output voltage V1 may be 5V. Each of the plurality of power converter circuits 1210 includes a first input, a second input, and an output. The first inputs of the plurality of power converter circuit 1210 are connected to the cathode of the diode D1, the second inputs are connected to the second pole of the second switch element Q2 of the over-heating protection circuits 160A, 160B, and the output of the plurality of power converter circuits 1210 outputs second output voltage V2, such as, voltage of 3.3V, 1.8V or 1.2V, to provide power to the CPU 130 and the load circuit 140A.

The load circuit 140A includes a first AND gate G1 and a load unit 1400. The first AND gate G1 includes a first input, a second input, and an output. The first input of the first AND gate G1 is connected to the CPU 130 to receive the control signals, the second input of the first AND gate G1 is connected to the control pole of the second switch element Q2 of the over-heating protection circuit 160A and 160B to receive the enable signals, and the output of the first AND gate G1 output control signals to the load unit 1400 to control whether the load unit 1400 works. The load unit 1400 is powered by one of the plurality of power converter circuits. In one embodiment, when the control signals from the CPU 130 and the enable signals from the over-heating protection circuits 160A and 160B are both high logic level, the first AND gate G1 sends the control signals with high logic level to control the load unit 1400 to work. When one of the control signals from the CPU 130 and the enable signals from the over-heating protection circuits 160A and 160B is low logic level, the first AND gate G1 sends the control signals with low logic level to control the load unit 1400 not to work.

Figure 5:
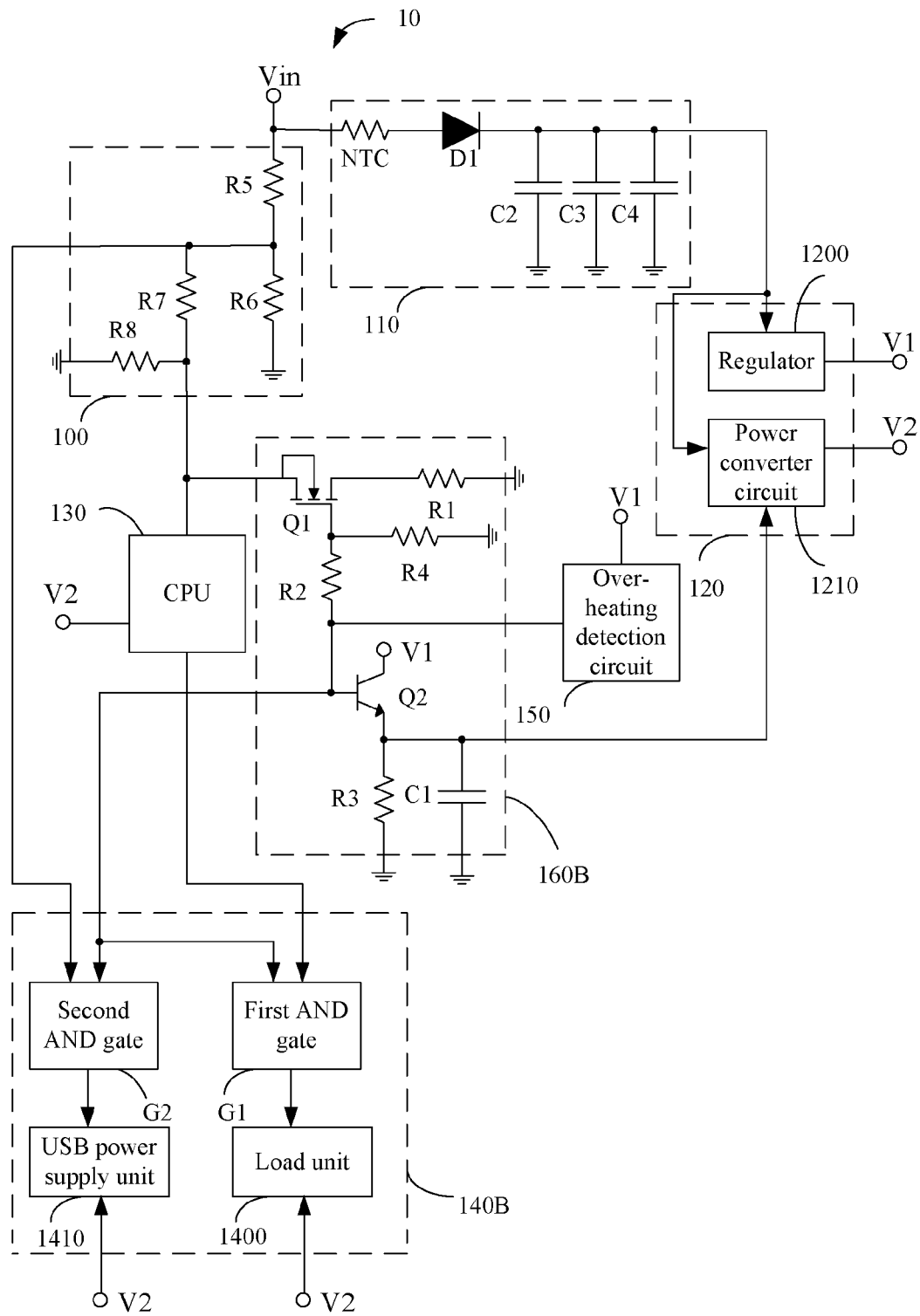
FIG. 5 is a circuit diagram of a second embodiment of a network communication device as disclosed.

FIG. 5 is a circuit diagram of a second embodiment of the network communication 10, especially a circuit diagram of the voltage detection circuit 100, the charging and discharging circuit 110, the power supply circuit 120, and a load circuit 140B. The difference between FIG. 4 and FIG. 5 is that the load circuit 140B of FIG. 5 further includes a second AND gate G2 and a universal series bus (USB) power supply unit 1410. The second AND gate G2 includes a first input, a second input, and an output. The first input of the second AND gate G2 is connected to a the junction of the fifth resistor R5 and the sixth resistor R6 of the voltage detection circuit 100, and the second input of the second AND gate G2 is connected to the control pole of the second switch element Q2 of the over-heating protection circuits 160A and 160B. The USB power supply unit 140 is connected to the output of the second AND gate G2, is powered by one of the plurality of the power converter circuits 1210, and provides power to USB clients under control of the second AND gate G2.

In one embodiment, when the voltage of the junction of the fifth resistor R5 and the sixth resistor R6 and the enable signals from the over-heating protection circuits 160, 160A, and 160B are both high logic level, the second AND gate G2 sends control signals with high logic level to control the USB power supply unit 1410 to work. When one of the voltage of the junction of the fifth resistor R5 and the sixth resistor R6 and the enable signals from the over-heating protection circuits 160, 160A, and 160B is low logic level, the second AND gate G2 sends control signals with low logic level to control the USB power supply unit 1410 not to work. Thus, the USB power supply unit 1410 stops providing power to the USB clients.

When the external power supply Vin provides power normally, the external power supply Vin charges the second capacitor C2, the third capacitor C3, and the fourth capacitor C4 via the thermal resistor NTC and the diode D1. The external power supply Vin also provides the input voltage to the regulator 1200 and the plurality of power converter circuits 1210 via the thermal resistor NTC and the diode D1. The regulator 1200 outputs the first output voltage V1 to the over-heating detection circuit 150 and the over-heating protection circuits 160, 160A, and 160B, and the plurality of power converter circuits 1210 output the plurality of second output voltage V2 to the CPU 130, the load unit 1400, and the USB power supply unit 1410. At this time, the voltage of the junction of the fifth resistor R5 and the sixth resistor R6 is nearly 3.67V, being high logic level, and the voltage of the dying gasp detection pin of the CPU 130 is nearly 1.67V. Therefore, the CPU 130 does not generate the dying gasp signals. If the network communication device 10 works normally and is not over-heat, the over-heating detection circuit 150 generates high logic level signals, such as, signals with voltage being 3.3V, to notify the over-heating protection circuit 160, 160A, and 160B. The first switch element Q1 is off, and the second switch element Q2 is on. Thus, the over-heating protection circuit 160, 160A, 160B sends the enable signals with high logic level to the plurality of power converter circuits 1210, the first AND gate G1, and the second AND gate G2. Both inputs of the first AND gate G1 and the second AND gate G2 are the high logic level signals, so the first AND gate G1 and the second AND gate G2 output high logic level signals to control the load unit 1400 and the USB power supply unit 1410 to wok.

If the network communication device 10 overheats now, the external power supply Vin still provides power, and the dying gasp detection pin of the CPU 130 is still 1.67V. The over-heating detection circuit 150 detects that the network communication device 10 is over-heat, and generates low logic level signals to notify the over-heating protection circuits 160, 160A, and 160B. Therefore, the first switch element Q1 is on, and the second switch element Q2 is off. The first resistor R1 is connected to the eighth resistor R8 in parallel, which pulls down the voltage of the dying gasp detection pin of the CPU to be 0.98V. Thus, the CPU 130 generates the dying gasp signals. The over-heating protection circuits 160, 160A, and 160B sends the enable signals with low logic level to the first AND gate G1 and the second AND gate G2 to cut off the load unit 1400 and the USB power supply unit 1410. Thus, power loss is decreased, which avoids increasing temperature resulted by the load unit 1400 and the USB power supply unit 1410. At the same time, the first capacitor C1 discharge via the third resistor R3, that is, the over-heating protection circuits 160, 160A, and 160B provides enable signals with slowing down voltage level to the plurality of power converter circuit 1210. Thus, the plurality of power converter circuits 1210 first provide necessary power to the CPU 130 to generate the dying gasp signals, and then is off. The regulator 1200 works normally to continuously provide power to the over-heating detection circuit 150 and the over-heating protection circuits 160, 160A, and 160B. In one embodiment, voltage on the first capacitor C1 before discharging is 4.8V, when the first capacitor C1 discharges to the voltage on the first capacitor C1 being 0.8V, the plurality of power converter circuits 1210 are off. The discharging process keeps 107 ms.

When the external power source Vin is off, the second capacitor C2, the third capacitor C3, and the fourth capacitor C4 discharges to the power supply circuit 120, and the diode D1 is off to block the discharging current. The voltage of the dying gasp detection pin of the CPU 130 is nearly 0, which decreases detection time. The plurality of power converter circuits 1210 continuously provide power to the CPU 130 using the discharging power from the second capacitor C2, the third capacitor C3, and the fourth capacitor C4, and the CPU 130 generates the dying gasp signals.

The network communication device 10 combines the power off detection function and the over-heating protection function, and generates the dying gasp signals under both the power off condition and the over-heat condition without inter-interference.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A network communication device, for generating dying gasp signals to send to a central office device, comprising:
    a voltage detection circuit operable to detect voltage of an external power supply;
    a charging and discharging circuit configured and structured to be charged when the external power supply is on and discharge when the external power supply is off;
    a power supply circuit, connected to the charging and discharging circuit, to convert input voltage of the power supply circuit into a plurality of output voltages;
    a central processing unit (CPU), connected to the voltage detection circuit and the power supply circuit, comprising a dying gasp detection pin connected to the voltage detection circuit, wherein the CPU determines whether the external power supply is off according to the detected voltage, and generates dying gasp signals upon the condition that the external power supply is off;
    a load circuit, connected to the CPU and the power supply circuit, to work under control of the CPU;
    an over-heating detection circuit, to detect whether the network communication device overheats; and
    an over-heating protection circuit, connected to the over-heating detection circuit and the dying gasp detection pin of the CPU, to turn off the load circuit and the power supply circuit upon the condition that the network communication device overheats and to make the CPU to generate the dying gasp signals, the over-heating protection circuit comprising:
    a first switch element, comprising a control pole, a first pole, and a second pole, the first pole connected to the dying gasp detection pin, the second pole grounded via a first resistor, and the control pole connected to the over-heating detection circuit via a second resistor;
    a second switch element, comprising a control pole, a first pole, and a second pole, the control pole of the second switch element connected to the control pole of the first switch element via the second resistor and connected to the load circuit, the first pole of the second switch element receiving a first voltage, and the second pole of the second switch element grounded via a third resistor and connected to the power supply circuit; and
    a first capacitor, connected in parallel with the third resistor.

2. The network communication device of claim 1, wherein the over-heating protection circuit further comprising a fourth resistor, connected between the control pole of the first switch element and the ground.

3. The network communication device of claim 1, wherein the first voltage is one of the plurality of output voltages.

4. The network communication of claim 1, wherein the voltage detection circuit comprises:
    a fifth resistor;
    a sixth resistor, the fifth resistor and the sixth resistor connected between the external power supply and the ground in series;
    a seventh resistor; and
    an eighth resistor, the seventh resistor and the eighth resistor connected between a junction of the fifth resistor and the sixth resistor and the ground, and a junction of the seventh resistor and the eighth resistor connected to the dying gasp detection pin.

5. The network communication device of claim 1, wherein the charging and discharging circuit comprises:
    a thermal resistor having one end connected to the external power supply;
    a diode having an anode connected to another end of the thermal resistor and a cathode connected to the power supply circuit; and
    at least one second capacitor, connected between the cathode of the diode and the ground.

6. The network communication device of claim 5, wherein the at least one second capacitor is in parallel.

7. The network communication device of claim 1, wherein the power supply circuit comprises:
    a regulator, comprising an input and an output, the input connected to the charging and discharging circuit, and the output outputting first output voltage to provide power to the over-heating detection circuit and the over-heating protection circuit; and
    a plurality of power converter circuits, each of the plurality of power converter circuits comprising a first input, a second input, and an output, the first inputs of the plurality of power converter circuits connected to the charging and discharging circuit, the second inputs of the plurality of power converter circuits connected to the second pole of the second switch element of the over-heating protection circuit, and the outputs of the plurality of power converter circuits outputting a plurality of second output voltages to provide power to the CPU and the load circuit.

8. The network communication device of claim 7, wherein the load circuit comprises:
   a first AND gate, comprising a first input, a second input, and an output, the first input of the first AND gate connected to the CPU, and the second input of the first AND gate connected to the control pole of the second switch element of the over-heating protection circuit; and
   a load unit, connected to one of the plurality of power converter circuits to be powered by one of the plurality of second output voltages and connected to the output of the first AND gate.

9. The network communication device of claim 8, wherein the load circuit further comprises:
   a second AND gate, comprising a first input, a second input, and an output, the first input of the second AND gate connected to the voltage detection circuit, and the second input of the second AND gate connected to the control pole of the second switch element of the over-heating protection circuit; and
   a universal series bus (USB) power supply unit, connected to the output of the second AND gate, to provide power to USB clients under control of the second AND gate.

10. The network communication device of claim 1, wherein the first switch element is a p type metal oxide semiconductor field effect transistor (PMOSFET), the control pole of the first switch element is a gate of the PMOSFET, the first pole of the first switch element is a source of the PMOSFET, and the second pole of the first switch element is a drain of the PMOSFET.

11. The network communication device of claim 1, wherein the second switch element is a NPN type transistor, the control pole of the second switch element is a base of the NPN type transistor, the first pole of the second switch element is a collector of the NPN type transistor, and the second pole of the second switch element is an emitter of the NPN type transistor.

12. A network communication device, for generating dying gasp signals, comprising:
   a voltage detection circuit operable to detect voltage of an external power supply;
   a charging and discharging circuit, configured and structured to be charged when the external power supply is on and discharge when the external power supply is off;
   a power supply circuit, connected to the charging and discharging circuit, to convert input voltage into a plurality of output voltages;
   a central processing unit (CPU), connected to the voltage detection circuit and the power supply circuit, comprising a dying gasp detection pin connected to the voltage detection circuit, wherein the CPU determines whether the external power supply is off according to the detected voltage, and generates dying gasp signals upon the condition that the external power supply is off;
   a load circuit, connected to the CPU and the power supply circuit, to work under control of the CPU;
   an over-heating detection circuit, to detect whether the network communication device overheats; and
   an over-heating protection circuit, connected to the over-heating detection circuit and the dying gasp detection pin of the CPU, to change voltage of the dying gasp detection pin of the CPU to make the CPU to generate the dying gasp signals and to turn off the load circuit and the power supply circuit upon the condition that the network communication device overheats.

13. The network communication device of claim 12, wherein the CPU determines whether the external power supply is off according to whether the voltage of the dying gasp detection pin is higher than a predetermined value.

14. The network communication device of claim 13, wherein the CPU determines the external power supply is off upon the condition that the voltage of the dying gasp detection pin is lower than the predetermined value, and determines the external power supply is on upon the condition that the voltage of the dying gasp detection pin is higher than the predetermined value.

15. The network communication device of claim 12, wherein the over-heating protection circuit comprises a first switch element comprising a control pole, a first pole, and a second pole, the first pole connected to the dying gasp detection pin, the second pole grounded via a first resistor, and the control pole connected to the over-heating detection circuit via a second resistor.

16. The network communication device of claim 15, wherein the over-heating protection circuit further comprises:
   a second switch element, comprising a control pole, a first pole, and a second pole, the control pole of the second switch element connected to the control pole of the first switch element via the second resistor and connected to the load circuit, the first pole of the second switch element receiving a first voltage, and the second pole of the second switch element grounded via a third resistor and connected to the power supply circuit; and
   a first capacitor, in parallel with the third resistor.

17. The network communication device of claim 16, wherein the second switch element is a NPN type transistor, the control pole of the second switch element is a base of the NPN type transistor, the first pole of the second switch element is a collector of the NPN type transistor, and the second pole of the second switch element is an emitter of the NPN type transistor.

18. The network communication device of claim 15, wherein the first switch element is a p type metal oxide semiconductor field effect transistor (PMOSFET), the control pole of the first switch element is a gate of the PMOSFET, the first pole of the first switch element is a source of the PMOSFET, and the second pole of the first switch element is a drain of the PMOSFET.

* * * * *